C. V. ROTE.
BRAKE SHOE MECHANISM.
APPLICATION FILED NOV. 20, 1916.

1,250,513.

Patented Dec. 18, 1917.
5 SHEETS—SHEET 4.

Witnesses
Philip E. Barnes
T. Clay Lindsey

Inventor
Charles V. Rote
By Sugrue, Cushman & Peq
Attorney

UNITED STATES PATENT OFFICE.

CHARLES V. ROTE, OF LANCASTER, PENNSYLVANIA, ASSIGNOR TO C. V. ROTE BRAKE SHOE CO., OF LANCASTER, PENNSYLVANIA, A CORPORATION OF DELAWARE.

BRAKE-SHOE MECHANISM.

1,250,513.     Specification of Letters Patent.     Patented Dec. 18, 1917.

Application filed November 20, 1916. Serial No. 132,331.

*To all whom it may concern:*

Be it known that I, CHARLES V. ROTE, a citizen of the United States, residing at Lancaster, in the county of Lancaster and State of Pennsylvania, have invented new and useful Improvements in Brake-Shoe Mechanism, of which the following is a specification.

This invention relates to improvements in brake mechanism, and more particularly to brake head and brake shoe devices.

Objects of my invention are to provide a braking device wherein practically all of the material of the shoe is utilized without endangering the brake head and thus avoiding the present practice of scrapping a brake shoe when it is but partly worn; to provide an intermediate member between the brake head and shoe, which intermediate member represents but a slight expenditure, it being manufactured at a minimum cost so that the shoe may be worn through almost completely without endangering the head, and should the shoe be carelessly or accidentally worn through the comparatively inexpensive intermediate member would be attacked and slight damage would be done; to provide a device wherein the inaccuracies or the relative displacements of the brake hangers on either side of the car may be corrected; to so construct the brake head, intermediate member, and brake shoe that they may be readily assembled and caused to fit snugly together and against lateral displacement; to provide the brake shoe with means for receiving upon its wearing face a second brake shoe so that when one brake shoe becomes worn it may be removed from the brake head and secured to the face of a new shoe and thus scrapping of the old shoe is entirely obviated; to provide a brake shoe which is strong in structure and which may be cheaply and readily manufactured; to provide a brake shoe with a steel back, which steel back may be expediently manufactured in accordance with my improved method herein described; and to provide an auxiliary securing means for the locking means which retains the brake shoe to the head so that accidental withdrawal of the locking means and the resultant separation of the shoe from the head is prevented.

The above and other objects of my invention are obtained in the structures described in the following specification and illustrated in the accompanying drawings, wherein—

Referring to the drawings wherein like numerals represent like parts, and more particularly to Figs. 1 to 8, 10 designates the brake head which in the present instance is disclosed as a hollow casing, but it is to be understood that my invention is not limited to the particular form of brake head shown, as it may be of any suitable shape. The brake head is provided upon it front face with spaced apart elongated openings 11, and the ends of the front face are bifurcated or provided with recesses or slots 12, and in the side wall of the brake shoe adjacent the openings 11 are provided elongated slots 13. The front face of the brake shoe, especially the central portion, is concave or curved inwardly so as to receive a member having a convex or swell back.

Figures 1, 2, 3, 4, 24:
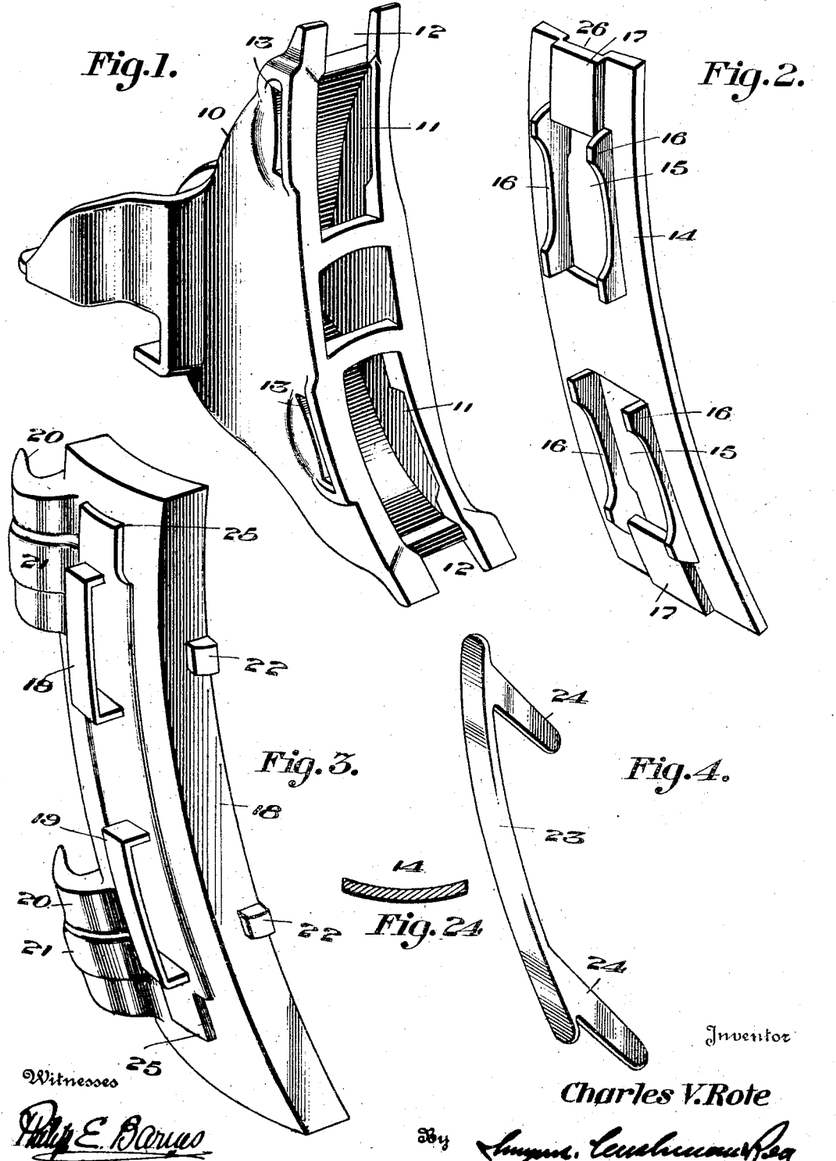
Figure 1 is a front outside perspective view of my improved brake head.
Fig. 2 is a rear perspective view of an intermediate member adapted to be secured to the face of the brake head shown in Fig. 1.
Fig. 3 is a perspective view of my improved brake shoe.
Fig. 4 is a perspective view of the key for securing the intermediate member and brake shoe to the head.
Fig. 24 is a sectional view taken on a transverse line through the center of the member shown in Fig. 2.
Figures 5, 6, 7, 8:
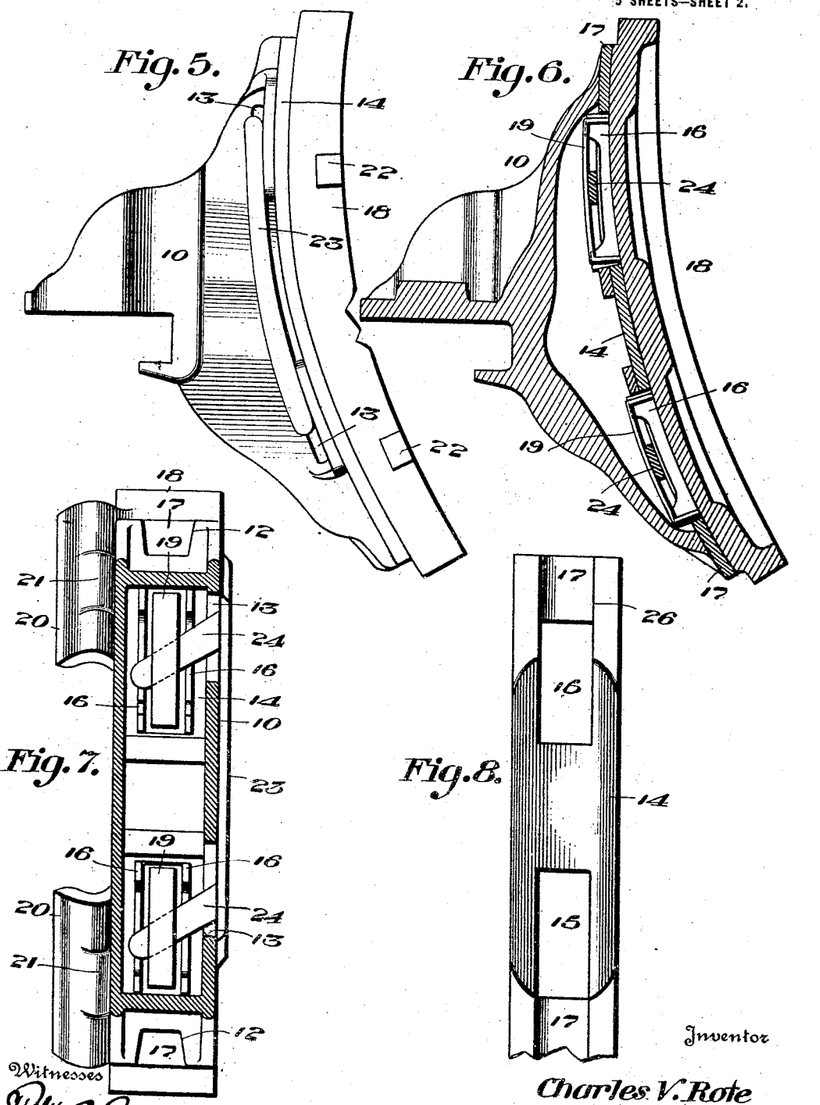
Fig. 5 is a side elevation showing the improved brake head with the intermediate member and the brake shoe secured thereto.
Fig. 6 is a vertical, longitudinal section through Fig. 5.
Fig. 7 is a transverse section through Fig. 5 taken vertically through the brake head.
Fig. 8 is a front elevation of the intermediate member.

The head 10 may receive upon its front face the intermediate member 14, shown in Fig. 2, which comprises a relatively thin strip of metal having elongated openings 15 adapted to register with the openings 11 of the brake head. The plate 14 constitutes a wear member in the sense that, when the shoe is worn through, the periphery of the wheel will engage against this plate. Along the sides of the openings 15 are flanges 16 which protrude through the openings 11 of the head so that lateral displacement of the intermediate member relative to the head is prevented. Adjacent the ends of the intermediate member 14 are bosses or lugs 17 which engage in the slots or recesses 12 in the face of the brake head so that lateral displacement of the intermediate member is further prevented. As shown in Fig. 8, the front face of the intermediate member is concave or curved inwardly in a manner similar to the front face of the brake head so that it may receive a brake shoe having a convex or swell back.

Fig. 3 discloses my improved brake shoe which comprises a body portion 18 having upon its rear face a pair of spaced apart keepers 19 and having along one of its edges wheel-engaging flanges 20, which flanges are provided with reinforcing ribs 21. Along the other edge of the shoe, adjacent its wearing face, are marking or indicating lugs 22 which serve the purpose of indicating when the shoe should be removed. When the shoe has been worn, (the intermediate member not being used,) to the extent that the lugs 22 have disappeared, under the usual method, the shoe is removed. The back of the shoe is convex or curved outwardly along its longitudinal center so that a swell is provided which, when the shoe is in place, fits in the concave face of the intermediate member.

The key member, shown in Fig. 4, comprises a handle portion 23 provided at either end with a blade 24 which extends obliquely from the handle, the blades being spaced apart so as to register with the slots 13 in the brake head.

When it is desired to assemble the various parts together, the intermediate member is placed upon the front face of the brake head with the flanges 16 engaging in the openings 11 and the swell or curved back of the intermediate member fitting snugly in the concave front face of the brake head. The brake shoe is then placed upon the front face of the intermediate member with the keepers 19 extending through the slots 11 and 15, and the key-ways of the keepers 19 in registry with the slots 13 of the head. The swell back portion of the shoe fits snugly into the concave portion of the intermediate member and end lugs or bosses 25 on the back of the shoe fit in the recesses or grooves 26 in the ends of the intermediate member. The key is then inserted transversely of the head, the blades 24 entering the openings 13 and engaging in the key-ways of the keepers 19, so that the shoe and intermediate member are securely retained in place upon the head.

Under the present practice, the brake shoe is attached directly to the brake head, and as the brake head is expensive, rather than run the risk of wearing through the brake shoe and ruining the head, the shoe is now removed when it is only partially worn, and scrapped. It is usual to scrap about a third or half of the shoe, that is, the shoe is scrapped when the indicating lugs are worn away. It is, of course, evident that the scrapped material represents a considerable item of expenditure and to eliminate this useless waste of money, I have provided my improved intermediate member. The intermediate member may be made at a relatively low cost, it being preferably of cast material, so that the attendant of the car may allow the brake shoe to wear down beyond the indicating lugs and should the intermediate member be worn into, it may be discarded, and but a slight loss of money is represented. It is not intended that the intermediate member should intentionally be worn, and it is supposed that the attendant will remove the worn shoe just before it is worn completely through. It is not necessary, however, to remove the shoe when it is only partially worn away and a large part remains for fear that the brake head may be worn into, but the brake shoe may be allowed to remain in place until it is worn down to the thickness of a wafer.

The intermediate member also serves the important function of squaring or allowing for the inaccuracies in the positions of the brake hangers at opposite sides of the car. It is well known that great difficulty is experienced in suspending the brake hangers with the shoes attached thereto, so that the hangers are in perfect alinement and the shoes on the opposite sides of the car engage the wheels with the same force. To remove the brake mechanism from which the shoes are suspended requires considerable time and is a very expensive procedure. When my intermediate member is used and it is found that the brake heads on opposite sides of the car are not in perfect alinement, the intermediate member may be forced against the wheels of the car and the wheels will grind the surfaces of the intermediate member so that these surfaces are in alinement. Shoes may then be placed upon the front faces of the intermediate member, and since the shoes are of equal thickness throughout their length the wearing faces of the shoes are in perfect alinement relative to the peripheries of the car wheels. Or, if desired, instead of wearing away the intermediate member itself a brake shoe may be placed on the front face of the intermediate member on opposite sides of the car and the brake shoes may be worn away so that their faces are concentric relative to the axis of rotation of the wheels which they engage.

It will be noted that the intermediate member is not adapted to be removed from the head and attached to the face of the brake shoe and that the intermediate member and brake shoe are secured to the brake head by the same locking device, namely, the locking key 23.

By providing an intermediate member and brake shoe with swell backs, as heretofore described, lateral play between the various parts is prevented. The brake shoe is adapted to be worn away to substantially a wafer, and by providing the shoe with a swell back the shoe, when it becomes partially worn through, does not break up into pieces for the swell back serves as a reinforcing rib and gives body to the worn out shoe.

Figures 9, 10, 11, 12:
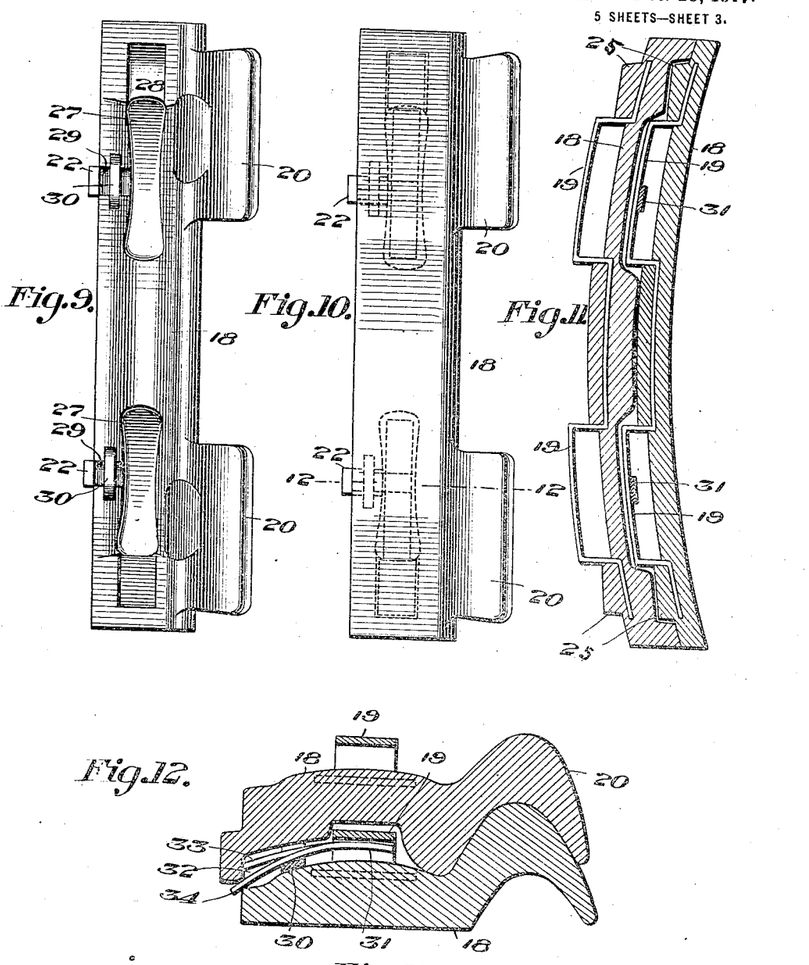
Fig. 9 is a front elevation of a new shoe made in accordance with this invention.
Fig. 10 is a front elevation of an old or worn shoe, the same being applied, as shown in dotted lines, to the wearing face of the new shoe.
Fig. 11 is a transverse vertical view through the shoes shown in Fig. 10.
Fig. 12 is a sectional view taken on the line 12—12, Fig. 10.
Figure 13:
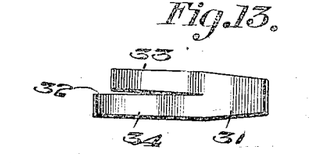
Fig. 13 is a spring key for securing one brake shoe to the wearing face of a second shoe.

Referring now to Figs. 9 to 13 wherein is disclosed my improved shoe and more particularly the means whereby one shoe is secured to the face of a second shoe, the shoe is provided upon its front face with recesses 27, the recesses being spaced apart to correspond to the positions of the keepers 19, and adjacent the outer ends of the recesses are grooves 28 which receive the lugs 25 provided on the back of the shoe. Midway between the ends of the recesses 27 and extending transversely of the shoe are grooves 29 which are bridged by arches or staples 30, which staples are cast into the shoe. The outer ends of the grooves 29 are closed by the indicating lugs 22 which were heretofore described and which serve as stops for the means for securing the shoes together. The means for securing two shoes together is disclosed in Fig. 13 as comprising a key or strip 31, preferably of spring material, which is split, as at 32, for a considerable distance of its length to form leaves or arms 33 and 34. The arm 33 is slightly shorter than the arm 34 and is bent slightly out of the line thereof. To secure one shoe to the wearing face of a second shoe, one is applied to the wearing face of the second with the keepers 19 of the first engaging in the recesses 27 of the second shoe, as shown in Figs. 11 and 12. The forward end of the key 31 is then inserted into the grooves 29, and by means of any suitable tool the key is driven into place by striking the end of the arm 34. When the key is forced into the position shown in Fig. 12, the spring arm 33 has passed inwardly of the indicating lug 22 and this arm springs bodily into the groove with its outer end engaging the inner face of the lug 22 so that withdrawal of the key is prevented. The key, when in locking position, protrudes into the key-way of the keeper 19 and lies beneath the staple or arch 30 so that the shoes are retained securely in position.

It is, of course, to be understood that the brake shoe may have a straight back rather than a swell back, and that various other changes may be made. When the old shoe is assembled to the face of the new shoe accidental withdrawal of the locking member is prevented, and, furthermore, persons cannot tamper with the interlocking brake shoes and withdraw one shoe from the face of the other. The interlocking brake shoes may be used in combination with the intermediate member, or, if desired, the brake shoe may be attached directly to the front face of the brake head. The intermediate member may, if desired, receive a shoe not provided with the recesses 27. When a brake shoe becomes worn to the extent that it is unsafe, it is removed from the face of the brake head and a new shoe is secured to the brake head, the old shoe being secured in the manner described to the face of the new shoe. The car wheels wear down the old shoe and wear the same completely through, and into the new shoe. When the new shoe becomes worn, so that it may now be called an old shoe, it is removed from the brake head, and secured to the face of a new shoe, which new shoe is secured directly to the face of the brake head.

Figures 14, 15:
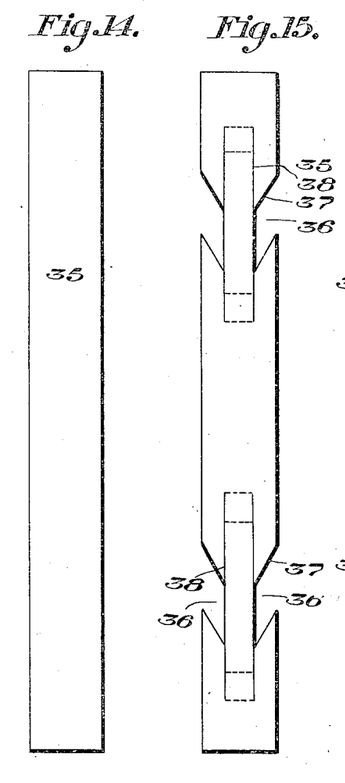
Fig. 14 discloses a strip of metal from which the steel back for my improved shoe may be made.
Fig. 15 discloses the strip after it is cut to form a steel back.
Figure 16:
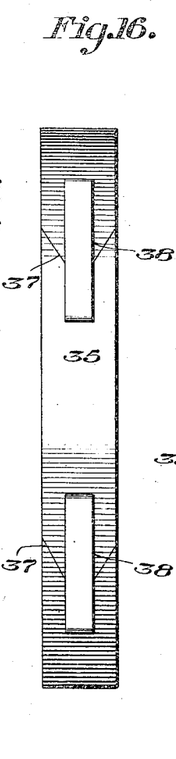
Fig. 16 is an elevation of a steel back as formed.
Figure 17:
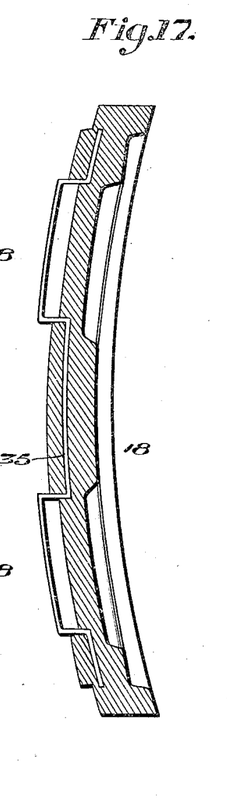
Fig. 17 is a sectional view with my improved shoe showing the steel back in place in the body of the shoe.

Referring now to Figs. 14 to 17, wherein are disclosed my improved steel back and the successive steps taken in the manufacture of the same, 35 represents a long, narrow strip of steel, which is relatively thin in thickness, and which has been cut to the proper length. After the strip is cut to the proper length, it is cut and slit, as shown in Fig. 15, and while this step may be carried out in a stamping machine, any other suitable means or devices may be used. Adjacent either end of the strip portions 36 are removed, the edges of these portions, as designated by 37, extending obliquely to the longitudinal direction of the strip. The strip is provided with a pair of parallel slots 38 which extend longitudinally of the strip and which serve the purpose of keepers. After the strip is cut, as shown in Fig. 15, the strip is foreshortened by applying pressure to its opposite ends so that the sections of the strip move together and the cut away portions 36 are closed, the edges 37 abutting each other and the strips provided between the longitudinal slots 38 being arched upwardly to form keepers. After the back is so formed, it is placed in the mold in which the shoe is formed, and the molten metal of the body of the shoe when poured into the mold flows over the back of the metal strip, so that the steel back is embedded in the body of the shoe. It will be noted that the steel back is manufactured from a single piece of material and that relatively few steps are necessary in its manufacture, it being merely necessary to cut the strip to the desired length, stamp the same, and then apply pressure to its opposite ends so as to foreshorten it.

Figures 18, 19, 20:
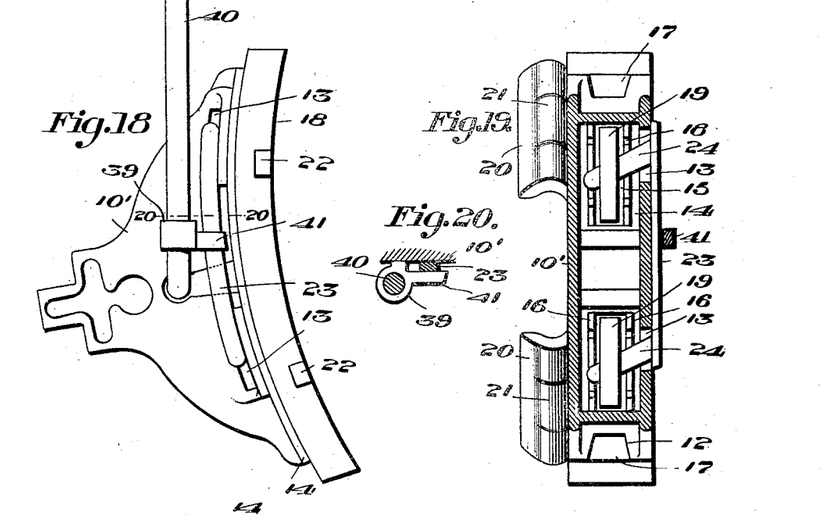
Fig. 18 is a side elevation of my brake mechanism having applied thereto the auxiliary securing means for retaining the locking means in position.
Fig. 19 is a sectional view taken vertically through the brake head shown in Fig. 18.
Fig. 20 is a sectional view taken on the line 20—20, Fig. 18.

Referring now to Figs. 18, 19 and 20, wherein is disclosed my preferred form of auxiliary securing means, this securing means is shown as having a sleeve portion 39 which is slidably mounted upon the hanger 40. Extending laterally from the sleeve is a finger 41 which is adapted to extend into the path of the key member 23. As shown in Fig. 20, the side of the sleeve adjacent the face of the brake head 10′ has a flattened surface so that rotation of the sleeve upon the hanger is prevented. When it is desired to lock the shoe in place upon the head, the locking key 23 is inserted as heretofore described, the auxiliary securing means 39 being moved upwardly upon the hanger. After the locking key 23 is in place, the sleeve drops by gravity, slides down the hanger 40 and the finger 41 extends into the path of the key 23 so that removal of the key is prevented. It will be noted that the auxiliary securing means moves bodily and in a rectilinear line and drops into locking position due to gravity.

Figures 21, 22, 23:
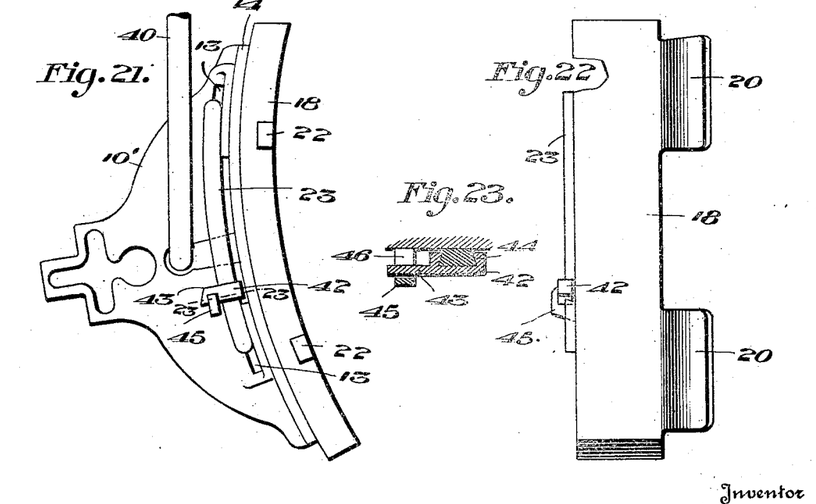
Fig. 21 is a view similar to Fig. 18, but shows a modified form of auxiliary securing means.
Fig. 22 is a front elevation of the structure shown in Fig. 21.
Fig. 23 is a sectional view taken on the line 23—23 of Fig. 21.

In Figs. 21 to 23, I disclose a modified form of auxiliary securing means which comprises a body portion 42 having an outstanding projection or finger 43. The body portion 42 is provided with a dove-tail groove 44 which loosely receives the handle 23 of the locking key. The auxiliary securing means may freely move up and down upon the handle 23. A lug 45 having a slot 46 is provided on the side of the brake head and when the auxiliary securing means is in the position shown in Fig. 21 the finger 43 engages in this slot so that accidental withdrawal of the key by jarring of the car or the like is prevented. As in the previous embodiment, the auxiliary securing means moves in a rectilinear line and drops by gravity into place. By providing the auxiliary securing means which drops automatically into securing position the locking key 23 cannot be left unsecured through the carelessness of the attendant of the car, for the auxiliary means drops into place without any action upon the part of the attendant.

It is to be understood that my improved brake mechanism is susceptible to various modifications and mechanical changes which would be within the scope of my invention without departing from the spirit of the following claims.

What I claim as new is:

1. In combination, a brake head, a brake shoe, an intermediate wear member interposed between the shoe and head, and a common locking means for securing said intermediate member and shoe to said head.

2. In combination, a brake head, an intermediate wear member on the front face of said brake head, a shoe on the front face of said intermediate member, and means engaging said shoe for locking said intermediate member and shoe to said head.

3. In combination, a brake head, a brake shoe, an intermediate wear member interposed between the head and shoe, a keeper on the back of said shoe, and means passing into said head and engaging in said keeper for securing said brake shoe and intermediate member together on said head.

4. In combination, a brake head having openings in its front face, an intermediate member having openings therethrough in registry with the openings in said brake head, a brake shoe having keepers on its rear face adapted to protrude through the openings in said head and intermediate member, and a key inserted into said head and engaging in the keyways of said keepers for locking said intermediate member and shoe in position upon the head.

5. In combination, a brake head having an opening in its front face, an intermediate member having an opening therethrough in registry with the opening in the brake head, a brake shoe having a keeper on its rear face adapted to protrude through the opening in said intermediate member and through the opening in said head, and locking means passing into said head and engaging in said keeper for securing said intermediate member and shoe to the head.

6. In combination, a brake head, an intermediate member on the face of said brake head, a shoe on the face of said intermediate member, keepers on the rear face of said brake shoe extending through said intermediate member into said brake head, and a key extending transversely into said brake head for engagement with said keepers to secure the shoe and intermediate member in position upon the head.

7. In combination, a brake head having openings in its front face and slots in the side wall adjacent said openings, an intermediate member having openings therethrough in registry with the openings in the front face of the brake head, a brake shoe having keepers on its rear face provided with keyways, said keepers being adapted to extend through the openings in said head and said intermediate member with their keyways registering with the slots in the side wall of said head, and a locking key having blades adapted to be inserted transversely of said head through said slots and engaging in the keyways of said keepers for securing the intermediate member and shoe in place upon the head.

8. An intermediate member comprising a strip of material having openings therethrough, and flanges along the adjacent edges of said opening extending at right angles to the surface of said strip.

9. In combination, a brake head having its front face concaved, an intermediate member having its back convexed to engage in the concaved face of said brake head, and a brake shoe having a swell-back, the front face of said intermediate member being concaved to receive the swell back of said brake head.

10. A brake shoe having on its rear face a keeper, and on its wearing face a recess to receive the keeper of a second shoe, a groove extending transversely from said recess, an arch or staple bridging said groove, and a wall closing the outer end of said groove.

11. In combination; a brake shoe having on its front face recesses with grooves extending transversely therefrom, arches or staples bridging said grooves, and a wall closing the outer end of said grooves; a second shoe having keepers engaging in said recesses of said first shoe; and a key inserted into said groove and engaging in said keepers and staples for holding the shoes together.

12. In combination; a brake shoe having on its front face a recess, a groove extending transversely of said recess and communicating therewith, and an arch bridging said groove; a second shoe having a keeper engaging said recess of said first shoe; and a key inserted transversely of said shoe into said groove and engaging in said staple and keeper for retaining the shoes together.

13. In combination; a brake shoe having recesses in its front face and grooves extending transversely from said recesses; a second shoe having keepers on its rear face; and key members comprising strips of spring material adapted to engage in said grooves and keepers for securing the shoes together.

14. In combination, a brake shoe having recesses in its front face, grooves extending transversely from said recesses, a closure wall at the outer end of said grooves, and an arch bridging said grooves; a second shoe having keepers on its rear face for engagement in said recesses of said first shoe; and a key of spring material for insertion in said groove beneath said arch and engaging in said keepers, said key being moved inwardly of said closure wall to prevent withdrawal of the key.

15. In combination, a brake shoe having in its front face recesses, grooves extending transversely of said recesses, arches bridging said grooves, and a closure wall for the outer end of said groove; a second shoe having keepers on its rear face engaging in said recesses of said first shoe; and a key member comprising a strip of spring material having one end thereof split longitudinally to form two arms, one of which is shorter than the other, said key being inserted into said groove beneath said arch and engaging in said keeper with the outer end of the shorter arm engaging the inner face of the closure wall.

16. In combination, a brake head, a brake shoe, a key member for locking said brake shoe to the head, and an auxiliary securing means movable bodily in a rectilinear line and adapted to drop due to gravity into the path of said key member to retain said key member in locking position.

17. In combination, a brake hanger, a brake head secured to said hanger, a brake shoe, means for locking the brake shoe to the head, and an auxiliary securing means slidably mounted upon said hanger and adapted to move, due to gravity, into the path of the locking member.

18. In combination, a hanger, a brake head on the hanger, a brake shoe, a key member inserted transversely of the head for locking the shoe to the head, and an auxiliary securing means slidably mounted upon said hanger and adapted to extend into the path of said locking key for retaining the same in position.

19. In combination, a hanger, a brake head on said hanger, a brake shoe, means for locking the shoe to the head, and an auxiliary securing means comprising a sleeve portion slidably mounted upon said hanger and having a finger adapted to extend into the path of said key, the side of said sleeve adjacent the brake head being square or flattened to prevent rotation of said auxiliary securing means upon the hanger.

20. In combination, a brake head, a brake shoe, a key member for locking said brake shoe to said head, an auxiliary securing means movable bodily in a rectangular line and adapted to drop due to gravity in the path of said key member to retain said key member in locking position, and means for guiding said auxiliary securing means.

21. In combination, a brake head, a brake shoe, an intermediate member interposed between said brake head and shoe, means on the shoe extending to the side of the intermediate member opposite that to which the shoe is located, and means passing into said head and engaging said first means for securing said brake shoe and intermediate member together on said head.

22. In combination, a brake head, a brake shoe, an intermediate member interposed between said head and shoe, and a common locking means located entirely to the opposite side of the front face of the intermediate member for securing said intermediate member and shoe to said head.

23. In combination, a brake head, an intermediate member on the front face of said brake head, a shoe on the front face of said intermediate member, and means engaging said shoe and located to the brake head side of the front face of said intermediate member for locking said intermediate member and shoe to said head.

In testimony whereof I have hereunto set my hand in presence of two subscribing witnesses.

CHARLES V. ROTE.

Witnesses:
B. F. WEAVER,
NELLIE C. SHAY.

Copies of this patent may be obtained for five cents each, by addressing the "Commissioner of Patents, Washington, D. C."